United States Patent [19]

Schütze et al.

[11] Patent Number: 5,078,794

[45] Date of Patent: * Jan. 7, 1992

[54] PROCESS FOR PREPARING 4,4'-DIAMINO-1,1'-DIANTHRAQUINONYL PIGMENTS

[75] Inventors: Detlef-Ingo Schütze; Werner Steinbeck, both of Bayerwerk; Anton Adams, Siegburg-Kaldonauen, all of Fed. Rep. of Germany

[73] Assignee: Bayer Aktiengesellschaft, Leverkusen, Fed. Rep. of Germany

[ * ] Notice: The portion of the term of this patent subsequent to Nov. 13, 2007 has been disclaimed.

[21] Appl. No.: 573,522

[22] Filed: Aug. 27, 1990

Related U.S. Application Data

[60] Division of Ser. No. 397,538, Aug. 22, 1989, Pat. No. 4,969,954, which is a continuation of Ser. No. 196,174, May 18, 1988, abandoned.

[30] Foreign Application Priority Data

Jun. 3, 1987 [DE] Fed. Rep. of Germany ....... 3718519
Jan. 13, 1988 [DE] Fed. Rep. of Germany ....... 3800683

[51] Int. Cl.$^5$ .............................................. C08K 5/17
[52] U.S. Cl. .................................... 106/493; 552/212
[58] Field of Search ................ 106/493; 260/371, 378; 552/212

[56] References Cited

U.S. PATENT DOCUMENTS

| 3,194,820 | 2/1966 | Jost et al. | 260/367 |
| 3,234,242 | 2/1966 | Jost et al. | 260/367 |

FOREIGN PATENT DOCUMENTS

| 1205215 | 11/1965 | Fed. Rep. of Germany . |
| 5754164 | 3/1982 | Japan . |
| 1408653 | 10/1975 | United Kingdom . |

*Primary Examiner*—Karl Group
*Assistant Examiner*—Deborah Jones
*Attorney, Agent, or Firm*—Sprung, Horn, Kramer & Woods

[57] ABSTRACT

Process for preparing 4,4'-diamino-1,1'-dianthraquinonyl pigments by desulphonation of 4,4'-diamino-1,1'-dianthraquinonyl-3,3'-disulphonic acid in sulphuric acid, characterized in that after the desulphonation water is added to the sulphuric acid solution, 4,4'-diamino 1,1'-dianthraquinonyl is isolated as sulphate, the sulphate is hydrolysed, if necessary by redissolving it in sulphuric acid and adding the solution to water, and the pigment is isolated, if necessary, after treatment with an organic solvent.

11 Claims, No Drawings

PROCESS FOR PREPARING 4,4'-DIAMINO-1,1'-DIANTHRAQUINONYL PIGMENTS

This is a division of application Ser. No. 397,538, filed Aug. 22, 1989, now U.S. Pat. No. 4,969,954, which is a continuation of Ser. No. 196,174 filed May 18, 1988.

The invention relates to processes for preparing 4,4'-diamino-1,1'-dianthraquinonyl pigments, both in high-hiding and in transparent form.

Owing to its high fastness level, 4,4'-diamino-1,1'-dianthraquinonyl represents a valuable red pigment for colouring paints and plastics.

Processes for preparing this pigment have been known for a long time (see for example Auslegeschrift 1,205,215).

To prepare it, for example 1-amino-4-bromoanthraquinon-2-sulphonic acid is reacted in an aqueous acid medium with copper powder or copper salts to give 4,4'-diamino-1,1'-dianthraquinonyl-3,3'-disulphonic acid. This acid is isolated and heated to temperatures between 120° and 220° C. with up to 90% strength sulphuric acid, the 4,4'-diamino-1,1'-dianthraquinonyl being formed by elimination of the sulphonic acid groups. The pigment is isolated by adding the sulphuric acid solution to ice water.

Using this method, pigments which give transparent colourings in paints and plastics are preferably obtained. Moreover, depending on the quality of the technical grade 1-amino-4-bromoanthraquinon-2-sulphonic acid used, this method in some cases leads to strongly bleeding, dull, blue-tinged pigments which need to be purified by expensive procedures.

The object of the present invention therefore consisted in developing a process which, irrespective of the quality of the technical grade 1-amino-4-bromoanthraquinone-2-sulphonic acid, leads to novel, pure high-hiding or transparent 4,4'-diamino-1,1'-dianthraquinonyl pigments.

The process according to the invention for preparing a 4,4'-diamino-1,1'-dianthraquinonyl pigment by desulphonation of 4,4'-diamino-1,1'-dianthraquinonyl-3,3'-disulphonic acid in sulphuric acid is characterized in that after the desulphonation water is added to the sulphuric acid solution, 4,4'-diamino-1,1'-dianthraquinonyl is isolated as sulphate, the sulphate is hydrolysed, if necessary by redissolving it in sulphuric acid and adding the solution to water, and the pigment is isolated.

Preferred embodiments of this process are:

1. After the desulphonation, the reaction mixture is cooled to 60° to 120° C., particularly preferably to 90° to 105° C.
2. After the desulphonation, the batch is diluted with water to an acid concentration of $\geq 50\%$, particularly preferably 60 to 75%, very particularly preferably 62 to 64%, the acid concentration being determined by titration of the entire reaction mixture with sodium hydroxide solution.
3. The sulphate is isolated by filtration with suction and briefly washed with about 65% strength sulphuric acid.
4. The isolated sulphate is dissolved in sulphuric acid at 70° to 120° C., preferably at 80° to 90° C.
5. The sulphate is hydrolysed directly, that is without prior dissolution of the sulphate in sulphuric acid, if necessary, in the presence of alkali.
6. The hydrolysis of the sulphate is carried out in the presence of a surfactant.
7. To prepare a high-hiding pigment, the solution of the sulphate is added to water in such a manner that the temperature of the batch is between 20° and 80° C., preferably 20°–50° C.
8. To prepare a transparent pigment, the solution of the sulphate is added to ice water in such a manner that the temperature of the mixture does not exceed 20° C., in particular 15° C.

By combining the preferred process steps 1–8, particularly preferred embodiments of the process according to the invention are obtained.

Suitable surfactants which are added for the hydrolysis of the sulphate according to 6 are nonionic, anionic and cationic surfactants.

Nonionic surfactants which may be mentioned are for example:

$C_{12}$- to $C_{20}$-alkanols, N-hydroxyalkylamides and N,N-bis-hydroxyalkylamides of $C_{16}$- to $C_{20}$-carboxylic acids, addition products of ethylene oxide to $C_{12}$- to $C_{20}$-alkanols, $C_{12}$- to $C_{20}$-fatty acids, amides, N-hydroxy-$C_2$- to $C_4$-alkamides and N,N-bis-(hydroxy-$C_2$- to $C_4$-alkyl)-amides of $C_{16}$- to $C_{20}$-fatty acids, $C_{12}$- to $C_{20}$-alkylamides, $C_8$-to $C_{20}$-alkylphenols and to monoglycerides of fatty acids.

Anionic surfactants which can be used are for example:

$C_{13}$- to $C_{18}$-paraffinsulphonic acids, $C_{13}$- to $C_{18}$-paraffindisulphonic acids, sulphosuccinic di-$C_1$- to $C_8$-alkylesters, sulphonated oleic dibutylamide, $C_8$- to $C_{18}$-alkylbenzenesulphonic acids, such as octyl-, nonyl-, decyl-, tetradecyl-, hexadecyl-, octadecyl- or dodecylbenzenesulphonic acid, mono- and di-$C_3$- to $C_8$-alkylnaphthalene-2-sulphonic acid, condensation products of naphthalene-2-sulphonic acid and/or $C_1$- to $C_4$-alkylnaphthalenesulphonic acid and formaldehyde, condensation products from phenol sulphonic acids, urea and formaldehyde, N-$C_{12}$- to $C_{18}$-alkyl-N-methylaminoacetic acids, $C_{16}$- to $C_{20}$-fatty acids, abietic acid, colophonium, hydrogenated colophonium, dimerized colophonium in the form of the ammonium and/or alkali metal salts or mixture of these acids.

Cationic surfactants which can be used are for example:

Quarternary ammonium compounds, such as salts of tri-($C_1$- to $C_4$-alkyl)benzylammonium, di-($C_1$- to $C_4$-alkyl) dibenzylammonium, $C_{10}$- to $C_{20}$-alkyl-tri-($C_1$- to $C_4$-alkyl) ammonium, di-($C_{10}$- to $C_{20}$-alkyl)-di-($C_1$- to $C_4$-alkyl)-ammonium, quarternary tri-($C_1$- to $C_8$-alkyl)-ammonium polyglycol ether, such as quarternized ethoxylated triethanolamine or tripropanolamine, N-$C_{10}$- to $C_{16}$-alkylpyridinium, benzylpyridinium, N-$C_{10}$- to $C_{18}$-imidazolinium salts or mixtures of these ammonium compounds in form of the chlorides, sulphates, methylsulphates, toluene- or benzenesulphonates.

The workup of the pigment can be carried out in a conventional manner, for example by filtration with suction, washing neutral with water and drying. A pigment is obtained which colours paints and plastics in clear, brilliant and elsewhere having bleeding and migration fastnesses.

A further preferred embodiment of the process according to the invention consists in treating the pigment presscake, which is preferably neutral, the dry pigment or the neutralized hydrolysis batch with a solvent.

The treatment with a solvent can be carried out in the presence of an acid buffer, such as sodium acetate or trisodium phosphate. Preferably, the treatment is carried out at 60° to 200° C., if necessary under pressure. For the preparation of a high-hiding pigment, the time of treatment is preferably about 2 to about 12 hours; for the preparation of a transparent pigment, the treatment preferably takes 15 to 60 minutes.

Examples of organic liquids which are suitable for the treatment are aliphatic alcohols, in particular alkanols having 1 to 10 C atoms and alkanediols having 2 to 3 C atoms, such as methanol, ethanol, butanol, hexanol, decanol, ethylene glycol and propylene glycol; esters of aliphatic carboxylic acids, in particular $C_1$–$C_4$-alkyl esters of alkane carboxylic acids having 1 to 8 C atoms, such as methyl formate, ethyl formate, methyl acetate, ethyl acetate, propyl acetate, butyl acetate, amyl acetate, methyl propionate, ethyl propionate, methyl butyrate, ethyl butyrate, methyl valerate, ethyl valerate, dimethyl adipate, diethyl adipate, triethyl citrate; formamides such as formamide, N-methylform-amide and N,N-dimethylformamide; acetamides such as N-methylacetamide, N,N-dimethylacetamide, N-ethylacetamide and N,N-diethylacetamide; amines such as diethylamine, triethylamine, propylamine, dipropylamine, butylamine, amylamine, hexylamine, ethylenediamine, trimethylenediamine, pentamethylenediamine, ethanolamine, triethanolamine and pyridine; optionally substituted aromatic hydrocarbons such as benzene, lower alkylbenzenes such as toluene, xylene, ethylbenzene, cumene and (technical grade) mixtures thereof, chlorobenzene, dichlorobenzene, trichlorobenzene and (technical grade) mixtures thereof and nitrobenzene.

Preferred esters employed are those of aromatic carboxylic acids, in particular the $C_1$–$C_4$-alkyl esters of aromatic carboxylic acids, in particular of benzene-mono-and -dicarboxylic acids, which may be substituted by hydroxyl. Typical examples are the $C_1$–$C_4$-alkylesters of benzoic acid, salicylic acid and phthalic acid, such as methyl benzoate, methyl salicylate and dimethyl phthalate.

For the conditioning of 4,4'-diamino-1,1'-dianthraquinonyl, phthalic esters are particularly suitable.

Preference is given to using di-$C_1$–$C_4$-alkyl phthalates, in particular dimethyl phthalate.

Thus, a novel process for preparing high-hiding 4,4'-diamino-1,1'-dianthraquinonyl pigments is characterized in that preferably the neutral, aqueous presscake of 4,4'-diamino-1,1'-dianthraquinonyl is treated with a phthalic ester at temperatures of about 70° to about 150° C., preferably for about 2 to about 12 hours, if desired under pressure.

A novel process for preparing transparent 4,4'-diamino-1,1'-dianthraquinonyl pigments is characterized in that preferably the neutral aqueous presscake of 4,4'-diamino-1,1'-dianthraquinonyl is treated with phthalic esters at temperatures around 100° C., preferably for 15–60 minutes.

The amount of organic liquid present in the conditioning medium should be at least 0.05 part by weight per part by weight of dry pigment. This ratio can vary within broad limits and depends on the type of organic liquid in each case. Preferably, about 0.1 to about 100 parts per weight, particularly preferably about 0.2 to about 50 parts by weight, of organic liquid per part by weight of dry pigment are used.

If esters of aromatic carboxylic acids are used, for example 0.2 to 4 parts by weight per part by weight of dry pigment are preferably used.

Preferably, the treatment medium furthermore contains about 1 to about 30 parts by weight of water, particularly preferably 3 to 20, very particularly preferably 5 to 12 parts by weight of water per part by weight of dry pigment.

After the conditioning is completed, the pigment is freed from the organic liquid in a conventional manner, for example by washing with water or distillation with or without steam, the possibility of using these methods being determined by the solubility properties of the organic liquid. Carboxylic esters can easily be removed from the pigment by hydrolysing the esters to form water-soluble carboxylates.

If desired, the pigment can additionally be coated with resins or resin-like products using conventional methods. Resin or resin-like products which may be used are in particular resin acids, such as abietic acid, and their isomers and also derivatives of these acids, for example salts of abietic acid, abietic esters, oxidation products of abietic acid, hydroabietic acid, dehydroabietic acid and also resin-like products based on these compounds or colophonium which has been chemically modified by dimerization or polymerization, hydrogenation, dehydrogenation, oxidation, decarboxylation, hydrolysis or esterification, and also colophony-modified maleate resins, maleate resins and phenolic resins.

The 4,4'-diamino-1,1'-dianthraquinonyl pigments obtained according to the invention are very pure and intense and are particularly suitable for colouring plastics, such as polyvinyl chloride, polyethylene, polyester or similar substances, or for pigmenting stoving enamels. The transparent pigment forms are in particular used for transparent mass and spin coloration of thermoplastics. The pigments show very good dispersibility, very good flow behaviour in the paint and yield brilliant and intense colorations.

The following examples illustrate the invention without limiting it to details.

EXAMPLE 1

70.9 g of disodium 4,4'-diamino-1,1'-dianthraquinonyldisulphonate (100% strength), which has been prepared in a known manner, for example according to Example 1 of German Auslegeschrift 1,205,215, are introduced over a period of 15 to 20 minutes into 350 g of 78% strength sulphuric acid which has been heated to 110° C. The mixture is heated to 140° C. and is stirred at this temperature for 5 hours.

The mixture is subsequently cooled to 100° C., and the yellow 4,4'-diaminodianthraquinonyl sulphate is precipitated by dropwise addition of 69 ml of water. Titration of the entire melt with sodium hydroxide solution yields 64%. The sulphate is filtered with suction and washed with 13 ml of 65% strength sulphuric acid.

The sulphuric acid presscake is then dissolved in 141 g of 96% strength sulphuric acid at 80° to 90° C. and stirred into 500 ml of water in such a manner that the temperature of the batch does not exceed 40° C. After stirring has been continued for ½ hour, the mixture is filtered with suction and the solid is washed neutral. 160 g of water-moist presscake having a 4,4'-diamino-1,1'-dianthraquinonyl content of 45.9 g is obtained.

For conditioning, 160 g of water-moist press-cake are stirred with 280 ml of water. After adding 11.2 g of sodium acetate and 14.8 g of dimethyl phthalate, the mixture is heated to 100° C. and stirred at that temperature for 5 hours. The mixture is subsequently cooled to 80° C., 17 g of 50% strength sodium hydroxide solution are added and the reaction mixture is hydrolysed at 80° C. for 2 hours. The mixture is filtered with suction, and the product is washed neutral with water and dried at 65° to 70° C.

45.9 g of red 4,4'-diamino-1,1'-dianthraquinonyl pigment which, when used for the colouring of stoving enamels, gives a very efficiently free-flowing paint, high glossiness, a high hiding power and a high bleed fastness is obtained.

EXAMPLE 2

The procedure of Example 1 is repeated with the exception that 20 g of methyl salicylate are used instead of dimethyl phthalate.

The pigment obtained by this method also shows high glossiness, high hiding power and high bleed fastness in stoving enamels.

EXAMPLE 3

The procedure of Example 1 is repeated with the exception that 25 g of methyl benzoate are used instead of dimethylphthalate and the mixture is heated at 100° C. for 8 hours. Again, when colouring stoving enamels, high glossiness, high hiding power and high bleed fastness combined with a very good flow behaviour of the paint are obtained.

EXAMPLE 4

The procedure of Example 1 is repeated with the exception that the water-moist presscake of 4,4'-diamino-1,1'-dianthraquinonyl is stirred with 300 ml of methanol and heated in an autoclave for 3 hours at 140° C.

The methanol is subsequently distilled off and the product is filtered with suction, washed and dried.

46.2 g of a red powder which has, for example in PVC, a very good dispersibility, high colour intensity, glossiness and migration fastness are obtained.

EXAMPLE 5

The procedure of Example 4 is repeated with the exception that 200 g of butanol are used instead of methanol and the mixture is heated at 140° C. for 6 hours.

A red powder is obtained which also has, for example in PVC, a very good dispersibility, high colour intensity, glossiness and migration fastness.

EXAMPLE 6

The sulphuric acid presscake obtained according to Example 1 is dissolved in 141 g of 96% strength sulphuric acid at 80° to 90° C. and is stirred into 500 ml of ice water in such manner that the temperature of the batch does not exceed 15° C. After stirring has been continued for ½ hour the mixture is filtered with suction, and the product is washed neutral to give 160 g of a water-moist presscake having a 4,4'-diamino-1,1'-dianthraquinonyl content of 45.1 g.

For conditioning, 160 g of water-moist press-cake are stirred with 280 ml of water. After adding 11.2 g of sodium acetate and 14.8 g of dimethyl phthalate, the mixture is heated to 100° C. and stirred at this temperature for 30 minutes. The mixture is subsequently cooled to 80° C., 17 g of 50% strength sodium hydroxide solution are added, and the reaction mixture is hydrolysed at 80° C. for 2 hours. The product is filtered off with suction, washed neutral with water and dried at 65°–70° C.

45.1 g of red 4,4'-diamino-1,1'-dianthraquinonyl pigment are obtained which can be used for transparent colouring of polypropylene.

EXAMPLE 7

For hydrolysis, the 4,4'-diaminodianthraquinonyl sulphate obtained according to Example 1 is stirred with 750 ml of water at room temperature, and the product is filtered off with suction and washed neutral with water. The moist filter cake is conditioned with dimethyl phthalate in analogy to Example 1.

46.0 g of red 4,4'-diamino-1,1'-dianthraquinonyl pigment are obtained which, when used for colouring stoving enamels, give a very efficiently free-flowing paint, high glossiness, a high hiding power and high bleed fastness.

EXAMPLE 8

For hydrolysis, the 4,4'-diaminodianthraquinonyl sulphate obtained according to Example 1 is added to a mixture of 750 ml of water and 90 ml of 50% strength sodium hydroxide solution at 10° C. and stirred; the reaction batch is subsequently brought to pH 7. Without isolating the pigment at this stage, the batch, after adding 11.2 g of sodium acetate and 14.8 g of dimethyl phthalate, is conditioned at 100° C. for 30 minutes and worked up in analogy to Example 6.

45.4 g of red 4,4'-diamino-1,1'-dianthraquinonyl pigment are obtained which can be used for transparent colouring of polypropylene.

We claim:

1. Process for preparing 4,4'-diamino-1,1'-dianthraquinonyl pigments by desulphonation of 4,4'-diamino-1,1'-dianthraquinonyl-3,3'-disulphonic acid in sulphuric acid, wherein, after the desulphonation, water is added to the sulphuric acid solution, 4,4'-diamino-1,1'-dianthraquinonyl is isolated as sulphate, the sulphate is hydrolysed to isolate the pigment, and the isolated pigment is subjected to a solvent treatment with an organic liquid selected from the group consisting of aliphatic alcohols, esters of aliphatic and aromatic carboxylic acids, formamides, acetamides, amines, substituted aromatic hydrocarbons, and unsubstituted aromatic hydrocarbons.

2. Process according to claim 1, wherein after the desulphonation the batch is diluted with water to an acid concentration of $\geq 50\%$.

3. Process according to claim 1, wherein after the desulphonation the batch is diluted with water to an acid concentration of 60 to 75%.

4. Process according to claim 1, wherein the hydrolysis is carried out in an alkaline medium, if necessary with the addition of a surfactant.

5. Process according to claim 1, wherein the pigment obtained is treated with a $C_1$–$C_4$-alkyl ester of an aromatic carboxylic acid.

6. Process according to claim 1, wherein the pigment obtained is treated with dimethyl phthalate.

7. Process according to claim 1, wherein the pigment is used as a moist presscake in the solvent treatment.

8. Process according to claim 1, wherein 0.05 to 100 parts by weight of solvent are used per part by weight of dry pigment.

9. Process according to claim 1, wherein the treating medium contains 3 to 20 parts by weight of water per part by weight of dry pigment.

10. A 4,4'-diamino-1,1'-dianthraquinonyl pigment prepared by the process according to claim 1.

11. The process according to claim 1, wherein the solvent treatment with the organic liquid is in the presence of an acid buffer.

* * * * *